(12) United States Patent
Ferreira et al.

(10) Patent No.: US 10,659,161 B2
(45) Date of Patent: May 19, 2020

(54) SYSTEM AND METHOD FOR THE TRANSMISSION OF OPTICAL SIGNALS

(71) Applicant: ASTON UNIVERSITY, Birmingham West Midlands (GB)

(72) Inventors: Filipe Ferreira, Birmingham West Midlands (GB); Naoise Mac-Suibhne, Birmingham West Midlands (GB); Andrew Ellis, Birmingham West Midlands (GB); Stylianos Sygletos, Birmingham West Midlands (GB); Mariia Sorokina, Birmingham West Midlands (GB); Christian Sanchez Costa, Birmingham West Midlands (GB)

(73) Assignee: ASTON UNIVERSITY, Birmingham West Midlands (GB)

( * ) Notice: Subject to any disclaimer, the term of this patent is extended or adjusted under 35 U.S.C. 154(b) by 0 days.

(21) Appl. No.: 16/140,152

(22) Filed: Sep. 24, 2018

(65) Prior Publication Data
US 2019/0028200 A1    Jan. 24, 2019

Related U.S. Application Data

(63) Continuation of application No. PCT/EP2017/057064, filed on Mar. 24, 2017.

(51) Int. Cl.
*H04B 10/2543*  (2013.01)
*H04B 10/29*  (2013.01)
(Continued)

(52) U.S. Cl.
CPC ......... *H04B 10/2543* (2013.01); *H04B 10/29* (2013.01); *H04B 10/50* (2013.01);
(Continued)

(58) Field of Classification Search
CPC ............ H04B 10/2543; H04B 10/6163; H04B 10/50; H04B 10/29; H04B 10/5053; H04B 10/5051; H04J 14/00
See application file for complete search history.

(56) References Cited

U.S. PATENT DOCUMENTS

| 6,304,369 B1 | 10/2001 | Piehler |
| 2002/0005970 A1 | 1/2002 | Lang |

(Continued)

FOREIGN PATENT DOCUMENTS

| EP | 1460788 A1 | 9/2004 |
| JP | 2013046230 A | 3/2013 |
| WO | 2017/162853 | 9/2017 |

OTHER PUBLICATIONS

Agrawal, "Nonlinear Fiber Optics", 3rd ed., Academic Press, 2001, pp. 211-216.

(Continued)

*Primary Examiner* — Leslie C Pascal
(74) *Attorney, Agent, or Firm* — Kilpatrick Townsend & Stockton LLP

(57) ABSTRACT

A system for transmission of an optical signal, the system including an optical coupler for splitting said signal into a first copy and a second copy. The optical coupler has an input for receiving the optical signal, a first output for the first copy and a second output for the second copy. The system also includes a first optical guide connected to the first output, a second optical guide connected to the second output and a superposition module for coherently superimposing the first copy and the second copy of the signal.

15 Claims, 7 Drawing Sheets

(51) Int. Cl.
*H04B 10/50* (2013.01)
*H04B 10/61* (2013.01)
*H04J 14/00* (2006.01)

(52) U.S. Cl.
CPC ..... *H04B 10/5051* (2013.01); *H04B 10/5053* (2013.01); *H04B 10/6163* (2013.01); *H04J 14/00* (2013.01)

(56) References Cited

U.S. PATENT DOCUMENTS

| | | | |
|---|---|---|---|
| 2003/0099439 | A1 | 5/2003 | Lonov |
| 2005/0058459 | A1* | 3/2005 | Chandrasekhar ...... G02B 6/266 398/161 |
| 2006/0092502 | A1 | 5/2006 | Kim et al. |
| 2013/0071119 | A1 | 3/2013 | Liu et al. |

OTHER PUBLICATIONS

Alwayn, "Fiber-Optic Technologies", Optical Network Design and Implementation, Available Online at: http://www.ciscopress.com/articles/article.aspp=170740&seqNum=13, Apr. 23, 2004, 2 pages.

Chen, et al., "Closed-Form Expressions for Nonlinear Transmission Performance of Densely Spaced Coherent Optical OFDM Systems", Optics Express, vol. 18, No. 18, Aug. 30, 2010, pp. 19039-19054.

Ellis, et al., "Approaching the Non-Linear Shannon Limit", IEEE, Journal of Lightwave Technology, vol. 28, No. 4, Feb. 15, 2010, 12 pages.

Ellis, et al., "Enhanced Superchannel Transmission Using Phase Conjugation", European Conference on Optical Communication (ECOC), 2015, 3 pages.

EP17713294.1, "Article 94(3) EPC Communication", dated Nov. 22, 2019, 7 pages.

Essiambre, et al., "Capacity Limits of Optical Fiber Networks", Journal of Lightwave Technology, vol. 28, No. 4, Feb. 15, 2010, pp. 662-701.

GB1605120.3, "Search Report", dated Feb. 22, 2017, 4 pages.

Ho, et al., "Electronic Compensation Technique to Mitigate Nonlinear Phase Noise", IEEE/OSA, Journal of Lightwave Technology, vol. 22, No. 3, Mar. 2004, pp. 779-783.

Ip, et al., "Compensation of Dispersion and Nonlinear Impairments Using Digital Backpropagation", Journal of Lightwave Technology, vol. 26, No. 20, Oct. 15, 2008, pp. 3416-3425.

Jansen, et al., "Optical Phase Conjugation for Ultra Long-Haul Phase Shift Keyed Transmission", Journal of Lightwave Technology, vol. 24, No. 1, Jan. 1, 2006, pp. 54-64.

Liu, et al., "Phase-Conjugated Twin Waves for Communication Beyond the Kerr Nonlinearity Limit", Nature Photonics, vol. 7, Jul. 2013, pp. 560-568.

Marcenac, et al., "40Gbit/s Transmission Over 406km of NDSF Using Mid-Span Spectral Inversion by Four-Wave-Mixing in a 2mm Long Semiconductor Optical Amplifier", Electronics Letters, vol. 33, No. 10, May 8, 1997, pp. 879-880.

PCT/EP2017/057064, "International Search Report and Written Opinion", dated Jun. 19, 2017, 17 pages.

\* cited by examiner

Fig. 1 – PRIOR ART

Fig. 2 – PRIOR ART a)
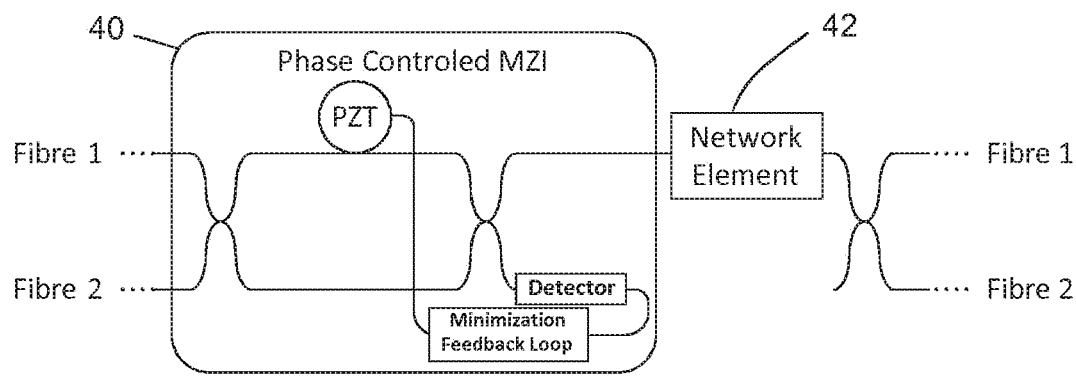
PZT - piezoelectric transducer
b)
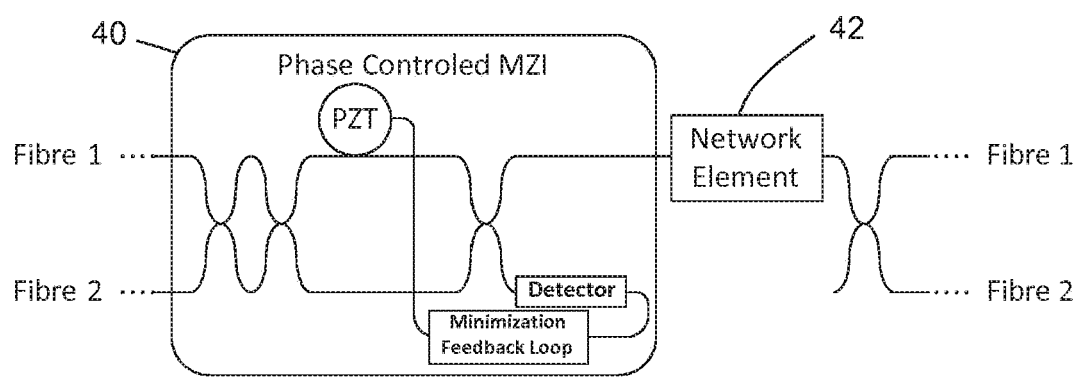
PZT - piezoelectric transducer
Fig. 6

SYSTEM AND METHOD FOR THE TRANSMISSION OF OPTICAL SIGNALS

CROSS-REFERENCES TO RELATED APPLICATIONS

This application claims priority to and is a continuation of International Patent Application No. PCT/EP2017/057064, filed Mar. 24, 2017, which claims priority from GB Patent Application No. 1605120.3, filed Mar. 24, 2016, the entire contents of which are hereby incorporated by reference in their entirety for all purposes.

TECHNICAL FIELD OF THE INVENTION

The present invention relates to transmission of optical signals in a manner which reduces noise or distortion caused by nonlinear effects.

BACKGROUND OF THE INVENTION

Fibre optic communication systems are today present in all telecommunications networks, and carry more than 80% of the world's long-distance signals. The success of optical networks is based on the invention of low-loss silica-based optical fibres, known as single-mode fibres (SMFs). These have allowed successive system capacity upgrades to meet the exponentially-growing user demand while simultaneously reducing the cost per transported information bit. However, silica-based fibres experience a significant limitation, wherein the refractive index of the fibres varies nonlinearly in response to an applied electric field. As a result, a signal distortion is introduced which increases nonlinearly with the signal power. More specifically, the distortion increases faster (approximately quadratically) than the increase in signal power. As a result, there is a maximum quantity of information that can be transmitted over the low-loss frequency band in optical fibres. The capacity limit can be calculated using the Shannon-Hartley theorem modified to include fibre nonlinearities, as discussed in Ellis et al. (2010) [A. Ellis, J. Zhao, D. Cotter, "Approaching the Non-Linear Shannon Limit," IEEE/OSA Journal of Lightwave Technology, vol. 28, no. 4, 2010].

Previously the Kerr effect has been addressed using nonlinearity compensation. Electronic compensation techniques are described in Ho et al. (2004) [K-P. Ho, and J. Kahn, "Electronic compensation technique to mitigate nonlinear phase noise," IEEE/OSA Journal of Lightwave Technology, vol. 22, pp. 779-783, 2004] and Ip et al. (2008) [E. Ip, and J. Kahn, "Compensation of dispersion and nonlinear impairments using digital back propagation," IEEE/OSA Journal of Lightwave Technology, vol. 26, pp. 3416-3425, 2008]. However, these present limitations such as the inability to mitigate interchannel nonlinear impairments, which require the knowledge of other wavelength-division multiplexing channels which may be unknown to the compensator, and the high complexity involved when many computation steps are required to undo nonlinear interactions in the case of dispersive transmission.

Mid-span spectral inversion (MSSI) is a well-known technique which is used to compensate chromatic dispersion, nonlinearity and the combined effect of the two. This is done by performing phase conjugation on the electric field of the optical signal near the middle of a transmission link and is described for example in Marcenac et al. (1997) and Jansen et al. (2006) [D. Marcenac, D. Nesset, A. Kelly, M. Brierley, A. Ellis, D. Moodie, C. Ford, "40 Gbit/s transmission over 406 km of NDSF using mid-span spectral inversion by four-wave-mixing in a 2 mm long semiconductor optical amplifier," in Electronics Letters, vol. 33, no. 10, pp. 879-880, 1997; S. L. Jansen, D. Borne, B. Spinnler, S. Calabro, H. Suche, P. M. Krummrich, W. Sohler, G.-D. Khoe, and H. de Waardt, "Optical phase conjugation for ultra long-haul phase-shift-keyed transmission," IEEE/OSA Journal of Lightwave Technology, vol. 24, pp. 54, 2006]. A transmission link using an MSSI method is shown in FIG. 2(a). However, MSSI requires that the transmission link be modified by inserting a phase conjugator inside the link, and requires symmetric power evolutions around the phase conjugator, leading to increased deployment requirements.

More recently, an alternative solution (herein: "the PCTW method") has been proposed. The method involves the cancellation of nonlinear signal-to-signal interactions by transmitting a pair of mutually phase-conjugated twin-waves (PCTW) together through the orthogonal polarization modes of a single optical fibre and coherently superimposing them electronically at the receiver site. This is discussed in Liu et al. (2013) [X. Liu, A. Chraplyvy, P. Winzer, R. Tkach and S. Chandrasekhar, "Phase-conjugated twin waves for communication beyond the Kerr nonlinearity limit," Nature Photonics, 2013]. There are several drawbacks to this method though, since half of the transmission capacity of every network element crossed is wasted to transmit the twin copy and the complexity of the receiver is increased, and more specifically, a coherent receiver is required. A schematic diagram of such a method is shown in FIG. 2(b).

SUMMARY OF THE INVENTION

At its most general, the present invention involves a "twin-fibre" approach for signal transmission which significantly reduces the drawbacks associated with Kerr distortion, without the drawbacks of the methods discussed above.

Accordingly an aspect of the present invention provides a system for transmission of an optical signal, the system including:
an optical coupler for splitting said signal into a first copy and a second copy, the optical coupler having:
  an input for receiving the optical signal,
  a first output for the first copy and
  a second output for the second copy;
  a first optical guide connected to the first output;
  a second optical guide connected to the second output;
  a superposition module for coherently superimposing the first copy and the second copy of the signal.

Correspondingly, another aspect of the present invention provides a method of transmitting a signal including the steps of:
splitting the signal into first copy which propagates along a first optical guide and a second copy which propagates along a second optical guide;
coherently superimposing the first copy and the second copy of the signal.

The following optional features apply equally to both the system and the method as described above, according to the present invention.

According to the method of this aspect of the invention, the first copy and second copy of the signal may be coherently superimposed at any location along the optical path. As a result, whenever a given network operation such as amplification, routing or detection need to be made, the technique is fully compatible with legacy SMF networks. No modification is required to transmitters, receivers, intermediate nodes, nor does it require the deployment of new fibres. The method is compatible with direct detection and coherent detection systems and may be used on all optical signals. In particular this presents an improvement over the MSSI method which requires that the transmission link be modified to include a phase conjugator. Using the method of the present invention, there is no need for modified receivers etc. to be included in the network, because the first and second copies of the signal may be coherently superimposed at any location. Clearly, in preferred embodiments, the superposition takes place at a location in the optical path which is before a network element, so that a single signal which does not require superimposition can enter said network element to be processed conventionally.

Since the level of distortion caused by the Kerr effect increases at a higher order than the signal strength, by splitting the signal into copies, and recombining the signals after transmission, the total amount of noise experienced by each as a result of the Kerr effect is less than if the signals were not split into copies.

The first and second optical guides may be first and second optical fibres, which are preferably bound in a single optical cable for improved space efficiency. Alternatively, they may be in the form of two uncoupled cores in a single multi-core optical fibre, which again improves the space efficiency and reduces the likelihood of significant thermal drift between the two cores. The splitting into the first and second copies of the signal is preferably done using an optical coupler. More preferably, to ensure that the signals in each of the first and second optical guides have equal or approximately equal intensities, the coupler is a 50:50 coupler.

In preferred embodiments, the superposition module includes an interferometer, and preferably a Mach-Zehnder (MZ) module including a Mach-Zehnder interferometer (MZI) may be used to coherently superimpose the first and second copies of the signal. In this context, the term "coherent" refers to a superposition in which there is no phase change between the two copies, and so no destructive interference may occur which might cause a weakening of the signal intensities. The MZ module preferable includes a first 2×2 MZI and a second 2×2 MZI, the outputs of the first 2×2 MZI being coupled to the inputs of the second 2×2 MZI. In alternative embodiments, the MZ module may further include a third 2×2 MZI, wherein the outputs of the second 2×2 MZI are coupled to the inputs of the third 2×2 MZI. Herein, the "2×2" is omitted for conciseness. The MZ module may include more than three 2×2 MZIs, since if there is a larger number of MZIs, then the phase uncertainty may be converted to photon-number uncertainty to a greater degree.

Preferably, the MZ module is phase-controlled, including a phase-controller configured to introduce a phase shift into one or both of the arms of one of the MZIs. In a preferred embodiment the phase controller may be in the form of a piezoelectric transducer (PZT), such as a piezoelectric fibre stretcher, which induces a stress and/or strain on the arm of the MZI on which it is located in response to an applied electric current. Such an induced stress and/or strain causes an optical phase shift in signals passing through that arm of the MZI. In order to ensure that there is a coherent superposition of the first and second copies of the signal on exiting the MZI, the phase controller is preferably configured to reduce the phase difference between the first and second copies of the signal to zero. To minimize the phase difference between the first and second copies of the signals, and hence to improve the degree of coherence of the superposition, the MZ module may undergo feedback control, and hence may further include a feedback controller. The feedback controller preferably includes a detector, at an output of one of the MZIs, preferably the final MZI, which is connected to a control element of the phase controller, so that the extent of the phase shifting can be altered in response to the degree of coherence of a signal at the MZI output on which the detector is located.

The phase controller means is preferably dimensioned to accommodate thermal drift between the first and second optical guides. For example, the degree of "stretching" that a fibre stretcher is able to execute may be great enough to accommodate for any thermal drift, as well as phase differences caused in response to other external stimuli. In one embodiment, the MZ module, having an input from each of the first and second optical guide, an output to a network element, and an output to a detector as described above.

In other embodiments of the present invention, there may be a plurality of couplers, arranged in M layers. Accordingly, the signal may be split into more than a first copy and a second signal. The couplers may be arranged in M layers, dividing the signal into $2^M$ copies. In this case, the same number of MZ modules as couplers, may be required to coherently superimpose the $2^M$ signals into a single signal for subsequent transmission to a network element. The advantages of such an arrangement are discussed mathematically later on in the application with reference to FIG. 3b. Since the overall amount of noise as a result of Kerr effect distortion is reduced on recombination, if the signal is split into a higher number of copies, splitting into a large number of copies is advantageous in terms of reducing the distortion caused by the Kerr effect.

In preferred embodiments, the twin-fibre method as described above may be combined with a spectral inversion step ("spectral inversion" and "phase-conjugation" may be used interchangeably). Spectral inversion is also employed in the PCTW method. In spectral inversion, the waveform of the signal is effectively reversed, or multiplied by (−1). Thus, when two perfectly phase-conjugated signals are added together, they cancel each other out.

More specifically, in methods according to the present invention, a first spectral inversion may be carried out by a first spectral inverter on the first copy of the signal, after that copy of the signal has been output from the coupler, the first optical guide being connected to the first output of the optical coupler via the first spectral inverter. Then, a second spectral inversion is then carried out before the signals are coherently superimposed. The second spectral inversion may either re-invert the inverted copy, or invert the un-inverted copy, since these will have the same effect. The noise which affects the two (or more) copies of the signal is substantially identical, since in preferred embodiments of the invention, the two optical guides carrying the respective copies (one of which is spectrally inverted) are located in as close proximity as possible. Thus, after the second spectral inversion step, and the superposition of the two (or more) copies, the noise components in each of the copies cancel each other out, leading to an improved SNR, in addition to the reduction in the Kerr effect distortion noise.

In branched systems, having more than one layer of couplers, to prepare more than two copies of the signals, the first spectral inversion may be carried out at any stage during the splitting process. The earlier on in the splitting process, i.e. the higher up the "tree", that the spectral inversion is carried out, the fewer spectral inverters (or phase conjugators) are required, since the spectrally inverted signal is then itself split by subsequent couplers. Similarly, the later the second spectral inversion step occurs, the fewer spectral inverters are required, since the spectral inversion can take place after several copies of the previously spectrally inverted signal have already been superimposed onto each other. This concept is illustrated clearly from a comparison of FIGS. 4b and 4c. In order to minimize the number of spectral inverters required it is preferable to have the first spectral inverter coupled to an output of the first (or leftmost, as in FIGS. 4b and 4c) coupler, and to have a second spectral inverter coupled to the input of the final (or rightmost, as in FIGS. 4b and 4c) MZ module.

It is preferable in the embodiments of the present invention which include spectral inversion steps to include all of the spectral inversion steps towards the edge of the transmission link. In this way, in contrast to the MSSI approach described earlier in the application, no phase conjugation elements are required in the middle of the transmission link. Hence, embodiments of the method involving this feature may be referred to as edge-span spectral inversion (ESSI). Besides the nonlinear distortion reduction given by the overlaid twin-fibre method, the ESSI method provides the same theoretical gain as the conventional MSSI method, but overcomes its main disadvantages: the spectral inverters are located at the edge of the spans (instead of at a fixed mid-span location), and so the power evolutions are inherently similar between the two parallel fibres (which may be located in the same cable or be cores of the same MCF)

In an additional aspect of the present invention, the ESSI approach may be taken, in combination with spatial division multiplexing, wherein signals from more than one transmitter, i.e. different signals, are transmitted in the same optical guide. In this case, there is no reduction in the nonlinear interactions, but the gain provided is as a result of the ESSI approach. Nevertheless, the two signals being transmitted experience the same nonlinear compensation provided by the ESSI approach as in the previous aspects of the invention.

Accordingly, this further aspect of the invention provides a system for transmission of a first signal from a first transmitter and a second signal from a second transmitter, the system including:
an optical coupler having:
a first input for receiving the first signal and a second input for receiving the second signal; and
a first multiplexed output and a second multiplexed output connected;
such that, in use, the coupler multiplexes the first signal with the second signal, and splits the resulting signal into a first multiplexed signal at the first multiplexed output and a second multiplexed signal at the second multiplexed output;
a first optical guide connected to the first output via a first spectral inverter;
a second optical guide connected to the second output; and
a superposition module for coherently superimposing the first multiplexed signal and the second multiplexed signal onto one another, the superposition module having a first input connected to the first optical guide and a second input connected to the second optical guide, wherein one of the inputs its connected to its respective optical guide via a second spectral inverter.

Where compatible, optional features from the first two aspects of the invention apply to this aspect. In particular the superposition module may take the same form as the superposition modules described above with respect to the previous aspects of the present invention. Similarly, there may be several layers of couplers to further split the multiplexed signal into more than two coupled signals. Correspondingly, there may be more than one layer of superposition modules required to recombine the signals into two final output signals which may subsequently be transmitted to their intended receivers.

BRIEF DESCRIPTION OF THE DRAWINGS

Embodiments of the present invention are now described with respect to the drawings, in which:

FIG. 6 shows a schematic of the phase-controlled MZ modules used in all aspects of the present invention, to coherently superimpose two signal copies after propagation over independent fibres, in which (a) two 2×2 couplers are used, and (b) three 2×2 couplers are used.

DETAILED DESCRIPTION OF THE INVENTION

Figure 1:
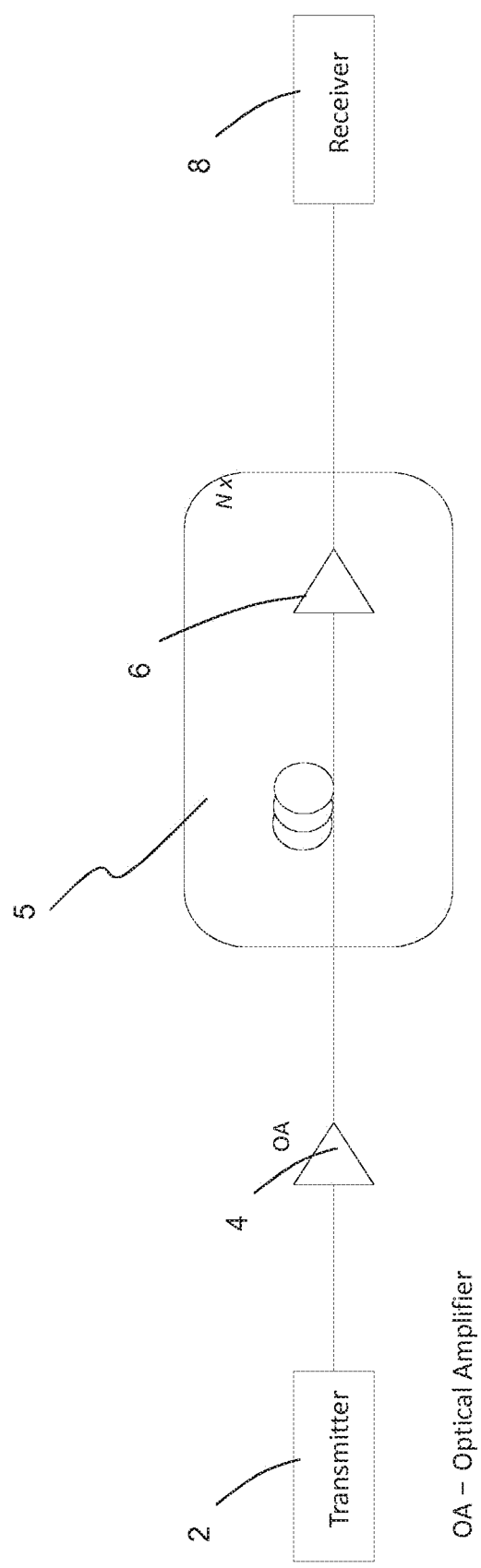
FIG. 1 shows a schematic of a known transmission link with no nonlinear compensation.

FIG. 1 shows a known transmission link which employs no nonlinear compensation techniques. The gross structure of the transmission links shown in FIGS. 1 to 5 is the same, and details occurring in more than one drawing will not be described more than once, for conciseness. The following description will focus on those features which are most important to aspects of the invention. FIG. 1 shows a transmission link between transmitter 2 and receiver 8. The transmission link includes an optical amplifier 4, and N network modules 5. Each optical network module 5 includes a length of optical fibre (denoted by the coils depicted) and an additional optical amplifier 6. It is noted that the transmission link may include other features, such as network elements.

Figure 2:
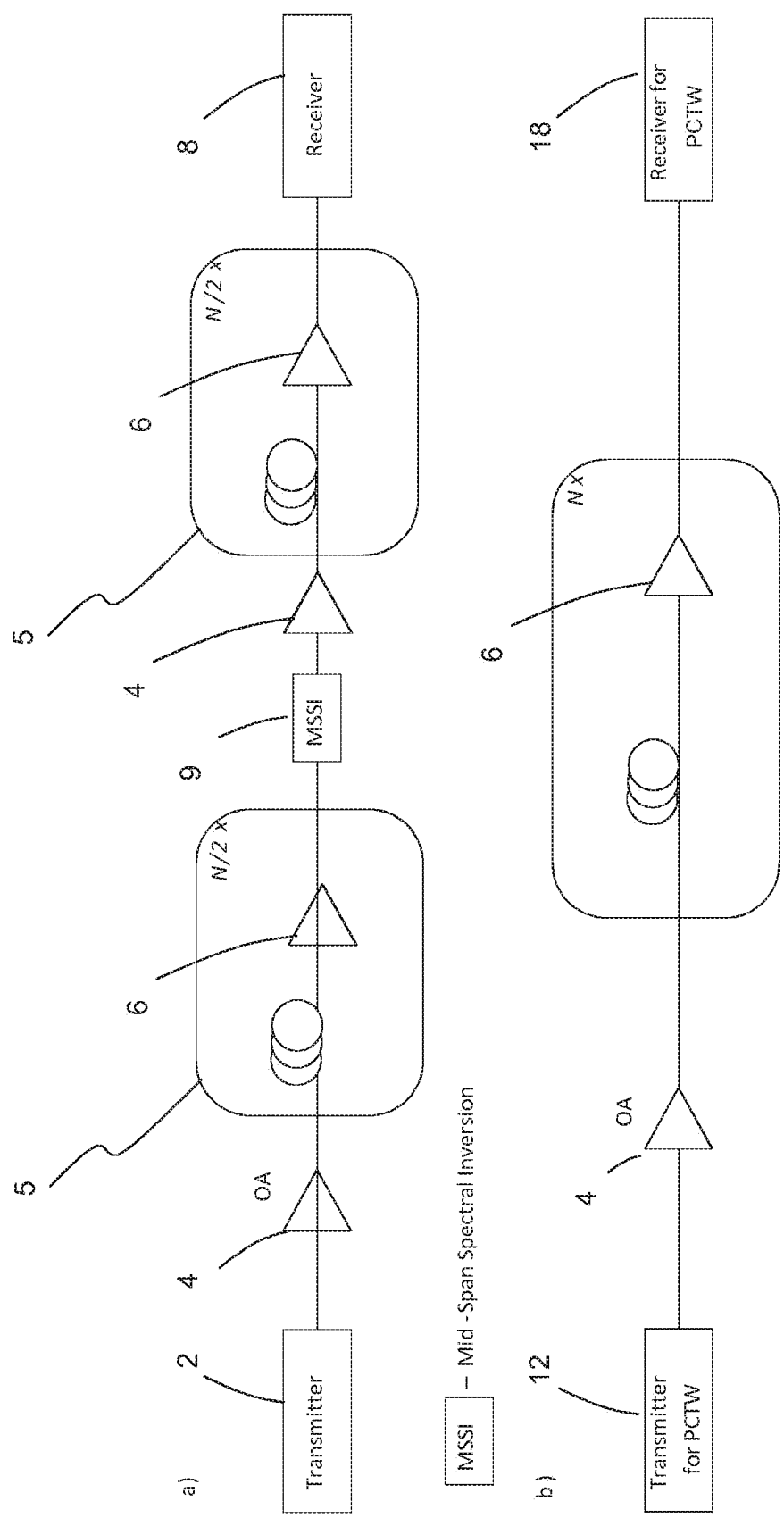
FIG. 2 shows a schematic of known transmission links with nonlinear compensation, in particular (a) mid-span spectral inversion (MSSI) and (b) a pair of phase-conjugated twin-waves co-propagating on two orthogonal polarizations of the same optical guide, and superimposed electronically at the receiver.

FIG. 2(a) shows a transmission link which includes two network modules 5. For the reasons set out above, this pairing is equivalent to a single network module 5 of e.g. FIG. 1. However, since in FIG. 2(a), the MSSI technique is employed to compensate for nonlinear distortion, an MSSI module 9 is required in the mid-span of the transmission link. As a result there are only N/2 network modules 5 in this particular configuration. In FIG. 2(*b*), rather than an MSSI module 9, the PCTW method is used for compensation, and as a result a transmitter 12 and receiver 18 are specially adapted for this method, at increased complexity and cost.

Figure 3:
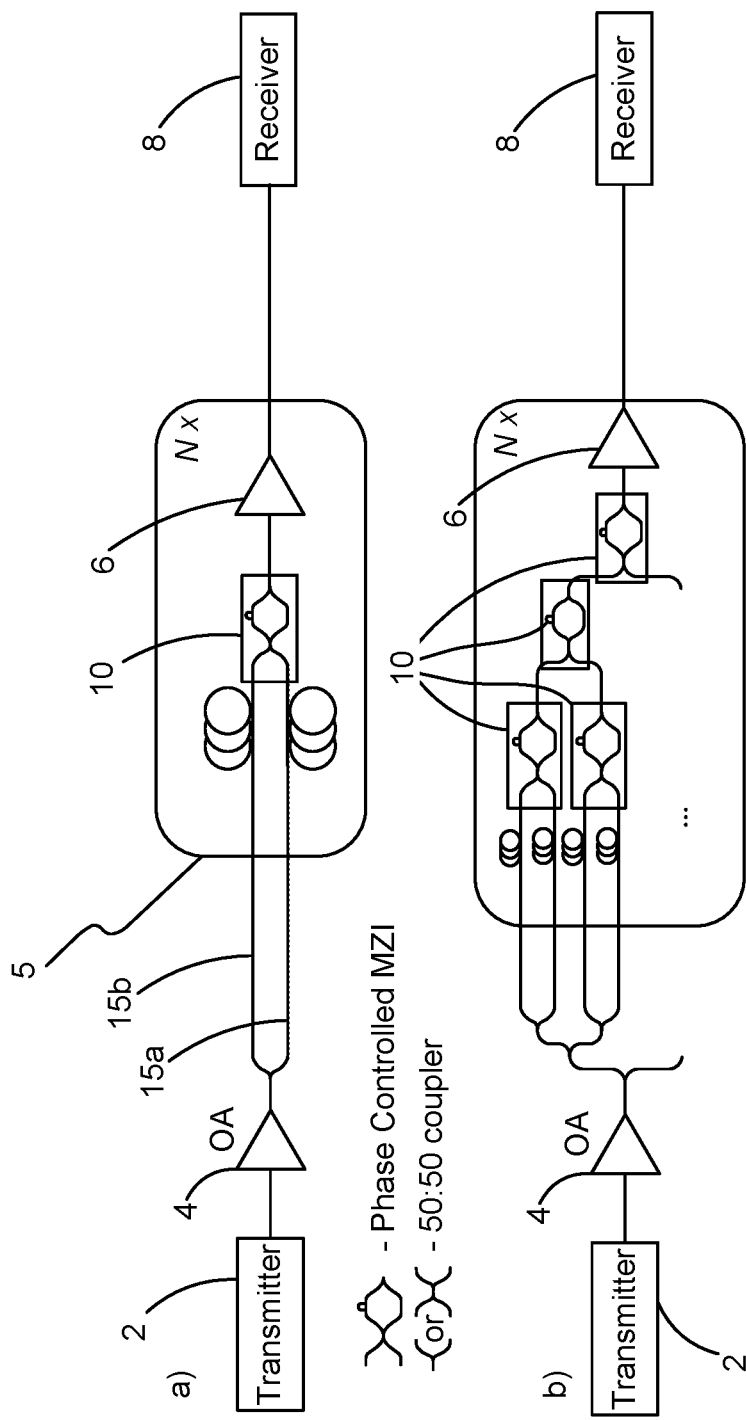
FIG. 3 shows a schematic of transmission links employing the approach of the first two aspects of the present invention, for reduction in nonlinear distortion, and in particular (a) with one pair of fibres in use and (b) M pairs of fibres in use.

FIG. 3(*a*) shows a transmission link according to the present invention. In this example, the signal is split into two copies, each of which propagate along one of the two optical fibres 15*a*, 15*b*. Then, inside network module 5, the first and second copies are coherently superimposed using MZ module 10, into a single signal which then enters optical amplifier 6 for transmission to the receiver 8. FIG. 3(*b*) has an identical structure, except the signal is split into $2^M$ copies by M layers of couplers (not shown). Then, a subsequent M layers of MZ modules are required to recombine the copies into the single signal which is output to the amplifier 6.

In order to quantify the maximum capacity improvement provided by the twin-fibre method of the present invention, the concept of nonlinear signal-to-noise ratio (SNR) must be introduced. Approximating the nonlinear Kerr distortion as an additive Gaussian noise means that the $SNR_{NL}$ can be defined as:

$$SNR_{NL} \approx \frac{I}{2n_0 + I(I/I_0)^2}$$

In the above: I is the launch power density, $n_0$ is white optical amplified spontaneous noise (ASE), $I(I/I_0)^2$ is the nonlinear noise due to Kerr distortion, and $I_0$ is the nonlinear characteristic power density. For the optimal launch power density, $SNR_{NL}$ is maximal, and given by:

$$(SNR_{NL})_{opt} \approx \frac{1}{3}\left(\frac{I_0}{n_0}\right)^{2/3}$$

By modifying these expressions to account for the twin-fibre method of the present invention, it can be shown that the method improves $SNR_{NL}$ by 6 dB in the nonlinear regime and by 2 dB for the optimal launch power, as compared to the system as shown e.g. in FIG. 1.

In the nonlinear regime, for the system shown in FIG. 3(*a*), $SNR_{NL} \approx I/[\frac{1}{2}^2 \cdot I(I/I_0)^2]$. For the system shown in FIG. 1, $SNR_{NL} \approx I/[I(I/I_0)^2]$.

In the optimal launch power density regime, for the system as shown in FIG. 3(*a*), $(SNR_{NL})_{opt} \approx \frac{1}{3}(2I_0/n_0)^{2/3}$.

For the system shown in FIG. 3(*b*), in which there are M pairs of fibres, rather than only two, in the nonlinear regime, in the nonlinear regime, $SNR_{NL} \cong I/[1/(2M)^2 \cdot I(I/I_0)^2]$ and in the optimal launch power density regime, $(SNR_{NL})_{opt} \cong \frac{1}{3}(2M \cdot I_0/n_0)^{2/3}$, where M is the number of parallel pairs of fibres.

This is, in the nonlinear regime, $SNR_{NL}$ increases by 6 dB each time the number of fibres is doubled, and in the optimal launch power regime, $SNR_{NL}$ increases by 2 dB each time the number of fibres is doubled. Finally, an increase of 6 dB on the $SNR_{NL}$ allows to increase the modulation constellation from 4-QAM to 16-QAM, for the same transmission distance, thereby doubling the system spectral efficiency from 2 bits/s/Hz/pol (current systems) to 4 bits/s/Hz/pol. Note that optical links operating at 4-QAM with additional $SNR_{NL}$ margin require a lower $SNR_{NL}$ increase.

Figure 4:
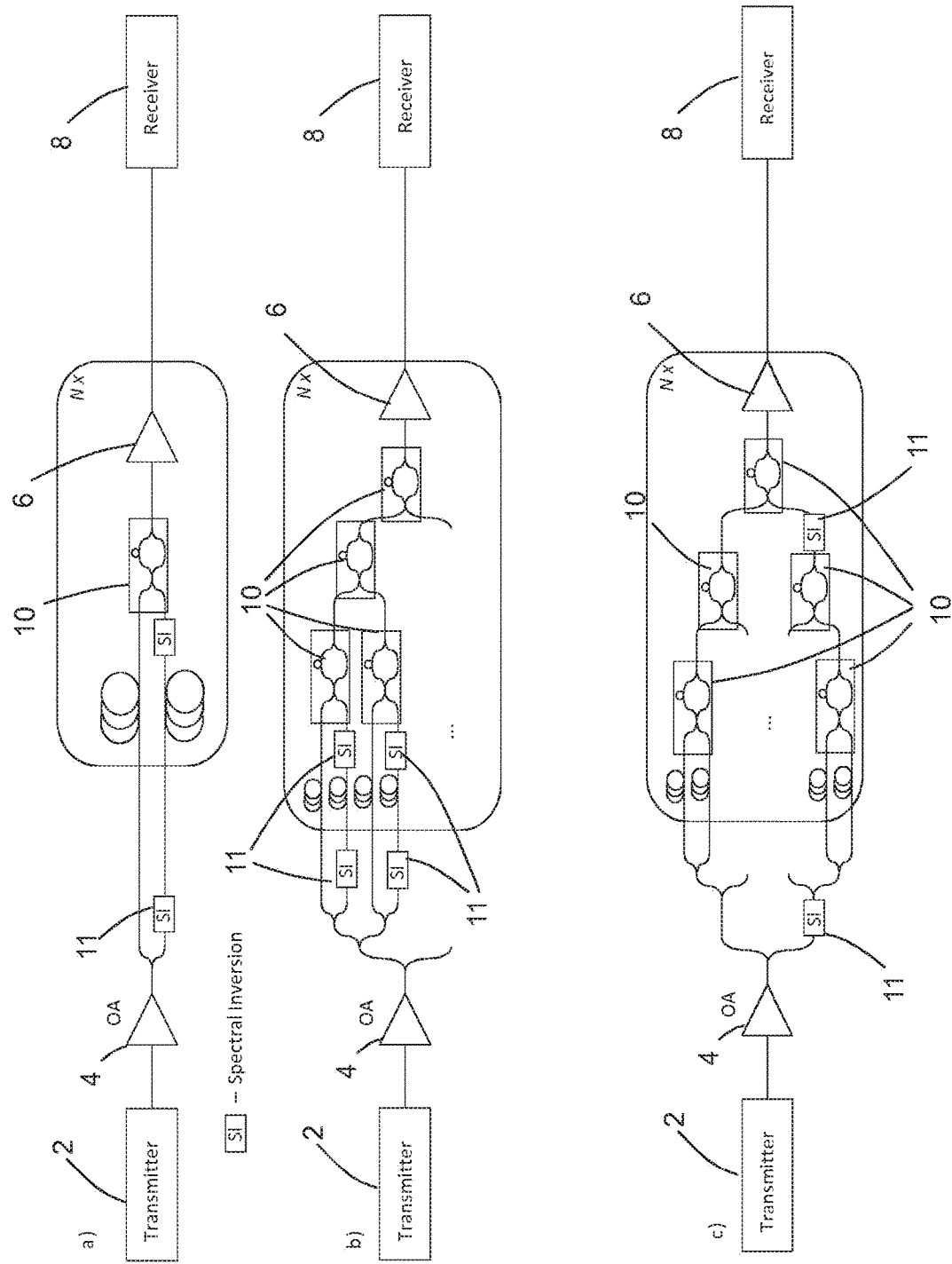
FIG. 4 shows a schematic of transmission links employing the approach of the first two aspects of the present invention, including ESSI, in which (a) one pair of fibres is in use, (b) M pairs of fibres are in use and (c) M pairs of fibres are in use but with a different arrangement of spectral inverters.

FIG. 4(*a*) shows a similar configuration to FIG. 3(*a*) except, first and second spectral inverters 11 are located between the splitting point and the MZ module. The first spectral inverter 11 inverts one of the copies of the signal from the transmitter 2, and the second spectral inverter 11 reinverts the signal into its original form. Then when the two copies are coherently superimposed at the MZ module 10, the noise cancels out, which supplements the effect of the twin-fibre method as described in an earlier section. FIGS. 4(*b*) and 4(*c*) show similar arrangements to FIG. 4(*a*), with more layers of couplers (not shown) and MZ modules. The increased degree of splitting of the original signal results in an improved effect from the twin-fibre approach. The numbers of required spectral inverters 11 differs depending on the points in the tree of couplers (not shown) and MZ modules at which they are located.

The method shown in FIG. 4 presents an additional $SNR_{NL}$ improvement coming from the phase conjugation on the top of the improvement coming from the twin-fibres method. The typical $SNR_{NL}$ improvement provided by phase conjugation is around 2 dB. Therefore, the usage of the schematic shown in FIG. 4*a*, employing only two fibres, allows the increase of the $SNR_{NL}$ by 8 dB in the nonlinear regime and by 4 dB in the optimal launch power regime, without any modification of the transmitter, receiver, intermediate nodes or amplifiers. Moreover, the usage of phase conjugation at the edge of the span in this case does not impose any routing constrains or link power symmetry present in the MSSI method, the link is "inherently" symmetric. Besides the nonlinear distortion reduction given by the overlaid twin-fibre method, the ESSI method provides the same theoretical gain than the conventional MSSI but overcomes its main disadvantages: the phase conjugators are located at the edge of the spans (instead of a fixed mid-span location), the power evolutions are "inherently" similar between the two parallel fibres (that can be located in the same cable or being cores of a same multi-core fibre).

Figure 5:
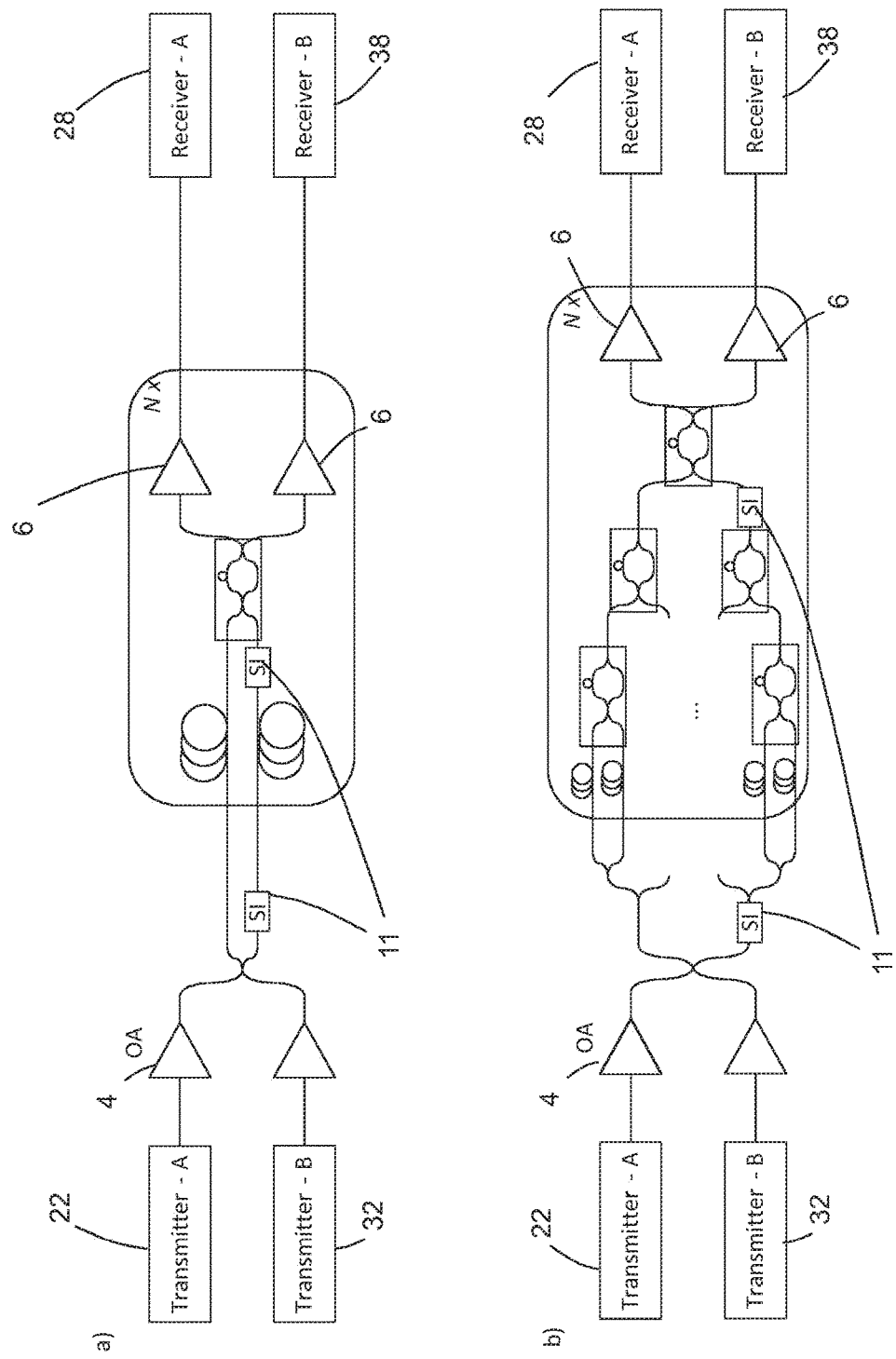
FIG. 5 shows a schematic of transmission links employing the approach of the third aspect of the invention, combining ESSI and SDM, in which (a) one pair of fibres is in use, and (b) M pairs of fibres are in use, but still with only two transmitters.

FIG. 5(*a*) shows an example of an embodiment of the third aspect of the invention, in which signals from two transmitters 22, 32 are first multiplexed at the coupler (not shown). The multiplexed signal is then split into two signals, one of which passes through spectral inverter 11. After this point in the system, the process is the same as that in FIG. 4(*a*). In the same way, FIG. 5(*b*) is analogous to FIG. 4(*b*).

In FIG. 5(*b*), since the number of fibres (2M) is bigger than the number of optical signals/transmitters (2 signals), a reduction of the nonlinear distortion does take place besides the nonlinear compensation provided by the ESSI technique. In the nonlinear regime, $SNR_{NL}$ $I/[1/M^2 \cdot I(I/I_0)^2]$ and in the optimal launch power density regime, $(SNR_{NL})_{opt} \cong \frac{1}{3}(M \cdot I_0/n_0)^{2/3}$ where M is the number of parallel pairs of fibres. So, for one pair of fibres the gain is zero but for more than one pair, in the nonlinear regime, $SNR_{NL}$ increases by 6 dB each time the number of fibres is doubled, and in the optimal launch power regime, $SNR_{NL}$ increases by 2 dB each time the number of fibres is doubled.

FIGS. 6(*a*) and 6(*b*) show two examples of MZ modules for use in all aspects of the present invention. In FIG. 6(*a*) there are two MZIs making up the MZ module, and in FIG. 6(*b*) there are three MZIs making up the MZ module. In both cases, one of the rightmost outputs of the MZ module is connected to a network element and the other is connected to a detector for a feedback control system.

In order to validate the present invention, the schematic in FIG. 3(*a*) has been assembled experimentally where the phase controlled MZI design in FIG. 6(*a*) is used. The experimentally assembled phase controlled MZI have shown an excess loss as low as 0.35 dB, demonstrating that this method can be implemented with negligible excess loss. The system experiment considered 10 Gbps intensity modulated (IM) signals, direct detected (DD) after coherent superimposition of two copies transmitted over two spools of 20 km of conventional single-mode fibre (SMF-28). The 10 Gbps signal was generated and detected using a commercial transceiver from JDSU part number JXP01TMAC1CX5GE2. Using the transceiver, the bit-to-error rate (BER) was measured and the Q-factor (Q) calculated using $Q(BER)=\frac{1}{2}erfc(BER/\sqrt{2})$. Note that $Q^2$ is directly proportional to $SNR_{NL}$. Finally, the results for the twin-fibre scheme and for the reference conventional (single-fibre) scheme were obtained under the same noise loading conditions. The results are shown in FIG. 7.

Figure 7:
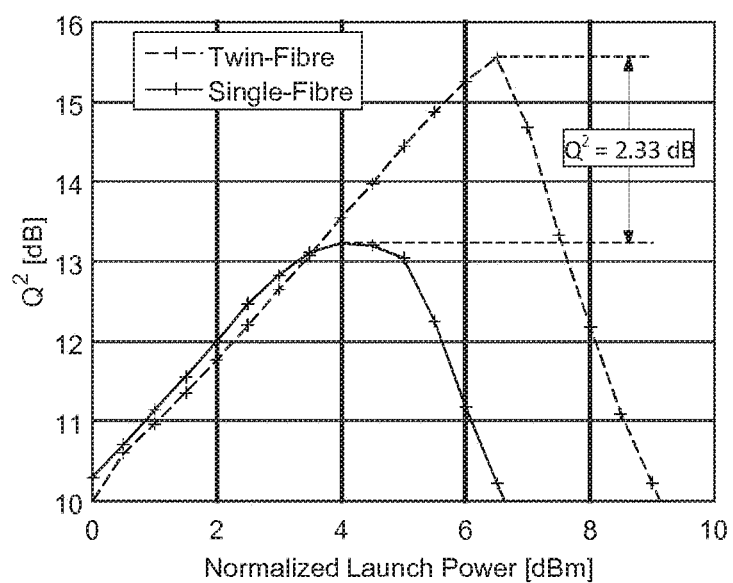
FIG. 7 shows a graph of the experimental Q-factor measured using a 10G optical transceiver operating at 9.953 Gbps. The Q-factor was calculated from the bit error count measured by the transceiver.

FIG. 7 shows that the twin-fibre invention improves the $Q^2$ (thereby $SNR_{NL}$) by 2.33 dB when operating at the respective optimal launch power. This improvement is slightly higher than the value predicted of 2 dB, which can be related with a reduction of the stimulated Brillouin scattering not accounted in section 4. Stimulated Brillouin scattering is responsible for the reflection of a fraction of the power of an incident beam. Above a certain threshold power stimulated Brillouin scattering can reflect most of the power of an incident beam. Moreover, in FIG. 7, it can be seen that in the linear regime the twin-fibre system presents a small penalty which is due to the 0.35 dB excess loss of the MZI. In the nonlinear regime, the $SNR_{NL}$ improvement approaches the 6 dB predicted in section 4.

What is claimed is:

1. A system for transmission of an optical signal, the system including:
   a plurality of optical couplers, arranged into $M \geq 3$ layers and configured to split the optical signal into $2^M$ copies, each of the plurality of optical couplers having:
      an input configured to receive the optical signal or a copy of the optical signal;
      a first output for a first copy; and
      a second output for a second copy;
   a plurality of first optical guides connected to each of the first outputs;
   a plurality of second optical guides connected to each of the second outputs; and
   a network module including M layers of Mach-Zehnder (MZ) modules, each MZ module being configured to coherently superimpose two of the $2^M$ copies, wherein:
      each MZ module in a first layer of the M layers of MZ modules includes two inputs, each configured to receive one of the $2^M$ copies and an output configured to output a combined signal;
      each MZ module in a second layer of the M layers of MZ modules includes two inputs, each configured to receive one of the combined signals and an output configured to output a second combined signal; and
      the MZ module in a third layer of the M layers of MZ modules includes two inputs, each configured to receive one of the second combined signals and an output configured to output a single output signal.

2. The system of claim 1, wherein each optical coupler is a 50:50 coupler.

3. The system of claim 1, wherein a phase controller is disposed on an arm of one or more of the MZ modules.

4. The system of claim 3, wherein the phase controller comprises a piezoelectric transducer.

5. The system of claim 3, wherein the MZ module further includes a feedback controller including a detector that is connected to a control element of the phase controller.

6. The system of claim 1, wherein each of the second optical guides is connected to the second output of one of the plurality of optical couplers via a first spectral inverter and wherein one of the two inputs of each MZ module is connected to either one of the plurality of first optical guides or one of the plurality of second optical guides via a second spectral inverter.

7. A method of transmitting a signal, the method comprising:
   splitting the signal into $2^M$ copies using a plurality of optical couplers, arranged into $M \geq 3$ layers;
   propagating a first half of the $2^M$ copies along a plurality of first optical guides and second half of the $2^M$ copies along a plurality of second optical guides; and
   coherently superimposing corresponding copies of the first half of the $2^M$ copies and the second half of the $2^M$ copies onto one another in a first layer of M layers of Mach-Zehnder (MZ) modules to provide a set of $2^M/2$ superimposed signals;
   coherently superimposing corresponding signals of the set of $2^M/2$ superimposed signals in a second layer of the M layers of MZ modules to provide a set of $2^M/4$ combined signals; and
   coherently superimposing the set of $2^M/4$ combined signals in a third layer of the M layers of MZ modules to provide a single output signal.

8. The method of claim 7, wherein each of the MZ modules comprises two inputs and an output.

9. The method of claim 8, wherein a phase controller is disposed on an arm of one or more of the MZ modules and is configured to control a phase of an optical signal that propagates through the arm.

10. The method of claim 9, wherein the phase controller is a piezoelectric transducer.

11. The method of claim 9, wherein the MZ module further includes a feedback controller including a detector that is connected to a control element of the phase controller.

12. The method of claim 7, wherein each of the plurality of second optical guides is connected to a second output of one of the plurality of optical couplers via a first spectral inverter configured to perform a first step of spectral inversion and wherein an input of each MZ module is connected to either one of the plurality of first optical guides or one of the plurality of second optical guides via a second spectral inverter configured to perform a second step of spectral inversion.

13. A system for transmission of a first signal from a first transmitter and a second signal from a second transmitter, the system including:
   an optical coupler having:
      a first input configured to receive the first signal and a second input configured to receive the second signal; and
      a first multiplexed output and a second multiplexed output connected such that, in use, the optical coupler multiplexes the first signal with the second signal to provide a resulting signal; and
      splits the resulting signal into a first multiplexed signal at the first multiplexed output and a second multiplexed signal at the second multiplexed output;
   a first optical guide connected to the first multiplexed output via a first spectral inverter wherein the first optical guide carries a spectrally inverted first multiplexed signal;
   a second optical guide connected to the second multiplexed output;
   a first layer of optical couplers configured to split the spectrally inverted first multiplexed signal into two first copies and the second multiplexed signal into two second copies;

a second layer of optical couplers configured to split the two first copies into four first copies and the two second copies into four second copies; and a network module including three layers of Mach-Zehnder (MZ) modules, wherein:
  each MZ module in a first layer of the three layers of MZ modules is:
    configured to coherently superimpose two of the four first copies onto one another, forming a superimposed first copy; or
    configured to coherently superimpose two of the four second copies onto one another, forming a superimposed second copy;
  a first MZ module in a second layer of the three layers of MZ modules is configured to coherently superimpose two superimposed first copies; and
  a second MZ module in the second layer of the three layers of MZ modules is configured to coherently superimpose two superimposed second copies onto one another;
  a second spectral inverter coupled to an output of the first MZ module in the second layer; and
  a MZ module in a third layer of the three layers of MZ modules has a first input connected to the second spectral inverter and a second input connected to the second MZ module in the second layer.

14. The system of claim 13, further comprising a phase controller disposed on an arm of one of the MZ modules.

15. The system of claim 14, wherein the phase controller comprises a piezoelectric transducer.

* * * * *